US012483955B2

(12) United States Patent
Bonnamy et al.

(10) Patent No.: US 12,483,955 B2
(45) Date of Patent: Nov. 25, 2025

(54) METHOD AND DEVICE FOR SWITCHING A WI-FI CONNECTION

(71) Applicant: ORANGE, Issy-les-Moulineaux (FR)

(72) Inventors: Jean-Michel Bonnamy, Chatillon (FR); Olivier Rabin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 360 days.

(21) Appl. No.: 18/337,701

(22) Filed: Jun. 20, 2023

(65) Prior Publication Data
US 2023/0413140 A1  Dec. 21, 2023

(30) Foreign Application Priority Data

Jun. 21, 2022  (FR) ........................................ 2206068

(51) Int. Cl.
*H04W 4/00* (2018.01)
*H04W 36/08* (2009.01)
*H04W 36/32* (2009.01)
*H04W 4/02* (2018.01)
*H04W 4/029* (2018.01)
*H04W 4/33* (2018.01)
*H04W 84/12* (2009.01)

(52) U.S. Cl.
CPC ......... *H04W 36/08* (2013.01); *H04W 36/322* (2023.05); *H04W 4/023* (2013.01); *H04W 4/029* (2018.02); *H04W 4/33* (2018.02); *H04W 84/12* (2013.01)

(58) Field of Classification Search
None
See application file for complete search history.

(56) References Cited

U.S. PATENT DOCUMENTS

| 11,323,978 | B2 * | 5/2022 | Ergen ..................... G01S 5/0205 |
| 12,380,784 | B1 * | 8/2025 | Siminoff .......... G08B 13/19656 |
| 2010/0069070 | A1 | 3/2010 | Shi et al. |
| 2015/0023271 | A1 * | 1/2015 | Nakano ............. H04W 72/0453 370/329 |
| 2018/0027463 | A1 * | 1/2018 | Chen ................... H04W 36/362 370/331 |
| 2019/0069216 | A1 * | 2/2019 | Patwardhan .......... H04W 48/02 |
| 2019/0098552 | A1 * | 3/2019 | Zhang ................... H04W 72/04 |

(Continued)

FOREIGN PATENT DOCUMENTS

CN  106792954 A  5/2017

OTHER PUBLICATIONS

French Search Report and Written Opinion dated Mar. 1, 2023 for corresponding French Application No. 2206068, filed Jun. 21, 2022.

(Continued)

*Primary Examiner* — Bob A Phunkulh
(74) *Attorney, Agent, or Firm* — David D. Brush; Westman, Champlin & Koehler, P.A.

(57) ABSTRACT

A method for switching a connection of a mobile Wi-Fi station from a first access point of a plurality of Wi-Fi access points to a second access point of the plurality. The method includes: establishing a logic link between the station and a carrier of the station, on the basis of a comparison between a first position of the carrier and at least one value in relation to a signal transmitted by the station; performing a switching decision on the basis of a second position of the carrier.

14 Claims, 8 Drawing Sheets

(56) References Cited

U.S. PATENT DOCUMENTS

| | | | | |
|---|---|---|---|---|
| 2019/0132780 | A1* | 5/2019 | Hahn | H04W 36/302 |
| 2019/0150043 | A1* | 5/2019 | Lundqvist | H04W 36/02 |
| | | | | 370/331 |
| 2019/0312924 | A1* | 10/2019 | Bhagavatula | H04W 24/02 |
| 2020/0288362 | A1 | 9/2020 | Saily et al. | |
| 2022/0086651 | A1* | 3/2022 | Neeli | H04W 84/12 |
| 2023/0023297 | A1* | 1/2023 | Valenza | G06T 13/20 |
| 2023/0164675 | A1* | 5/2023 | Liao | H04W 48/14 |
| | | | | 370/338 |
| 2023/0388826 | A1* | 11/2023 | Akhtar | H04W 24/08 |

OTHER PUBLICATIONS

Fadel Adib et al., "Multi-Person Localization via RF Body Reflections", NSDI' 15: Proceedings of the 12th Usenix Conference on Networked Systems Design and Implementation, May 2015 (May 2015), XP002808736.

\* cited by examiner

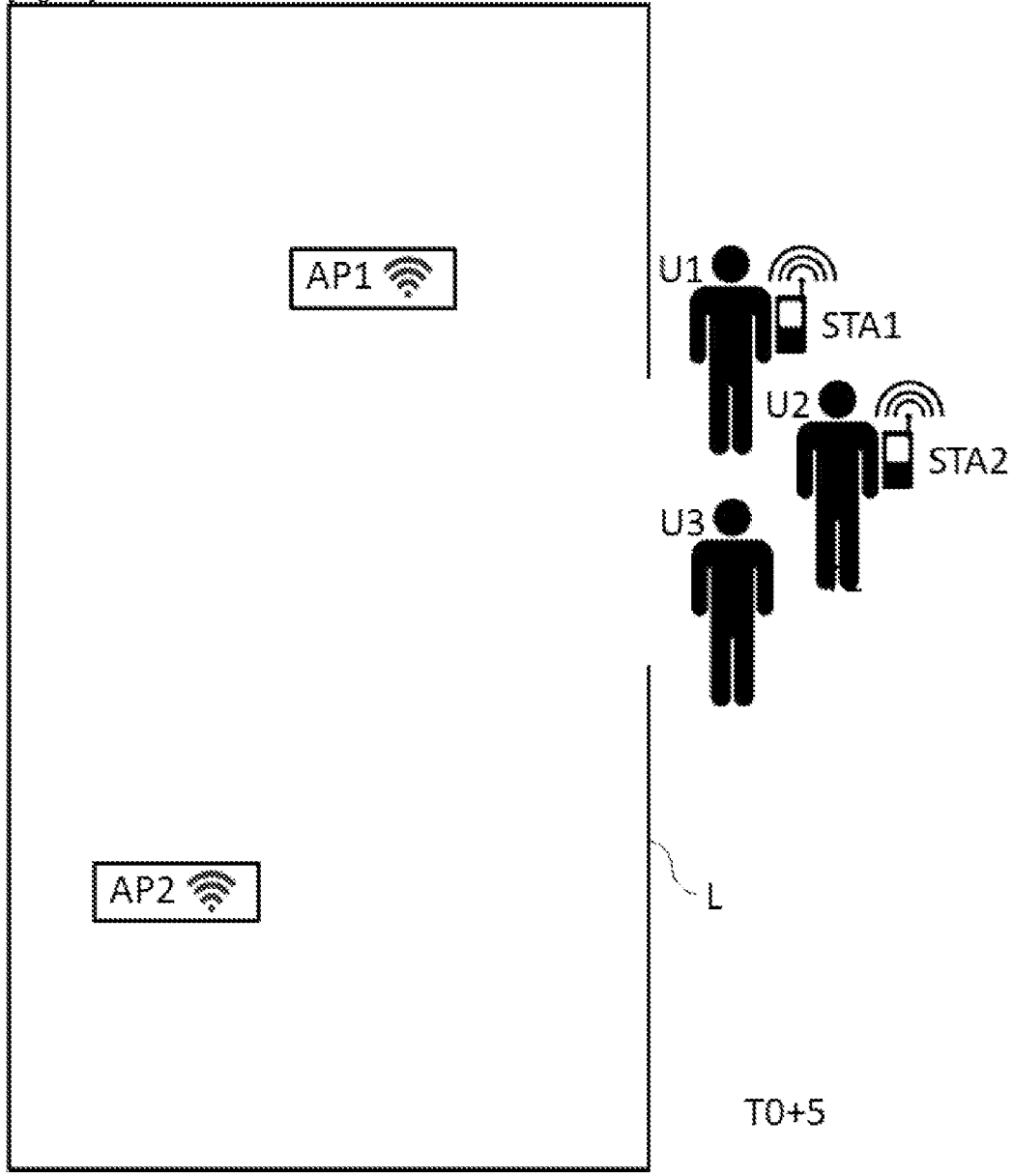

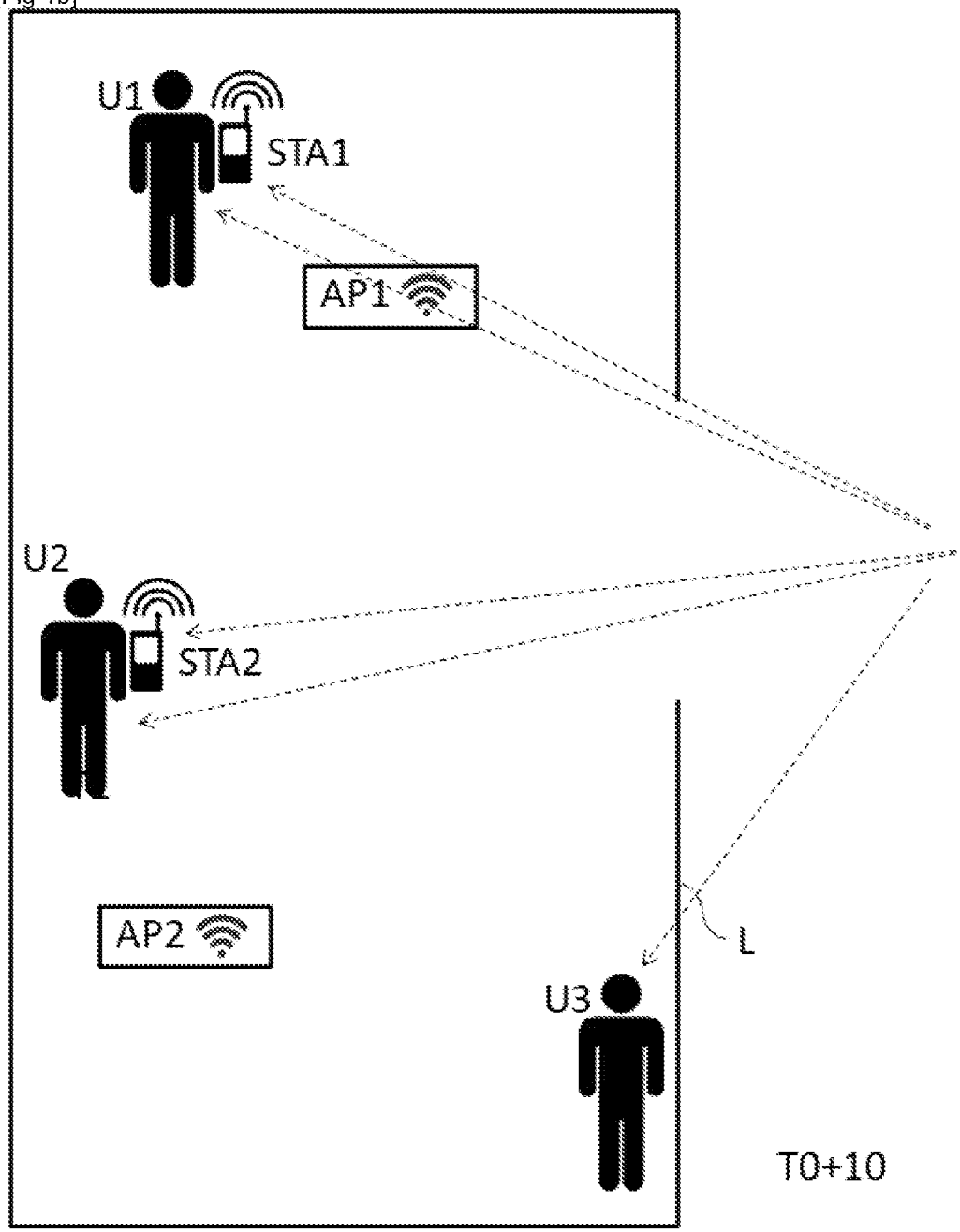

[Fig 1c]
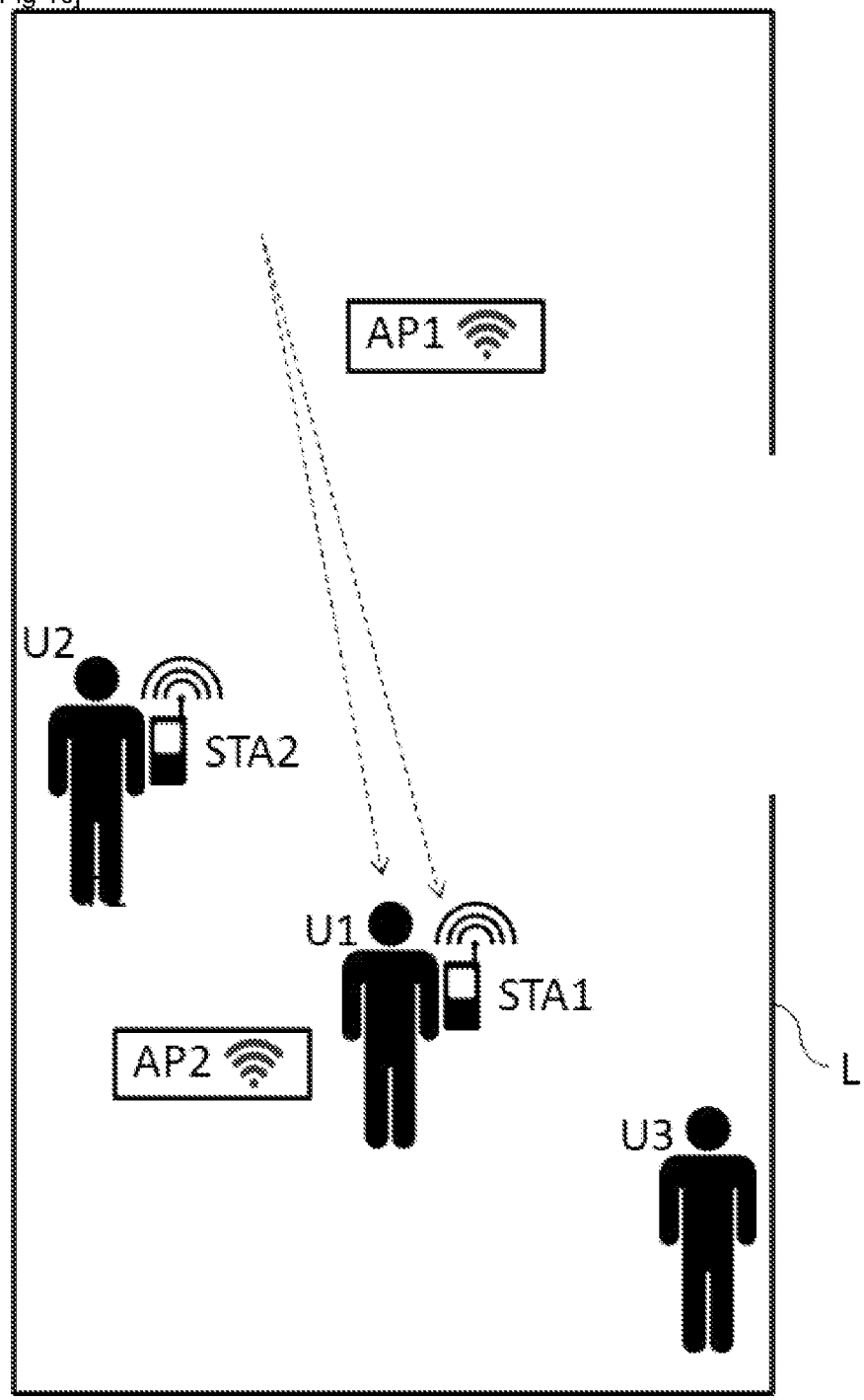

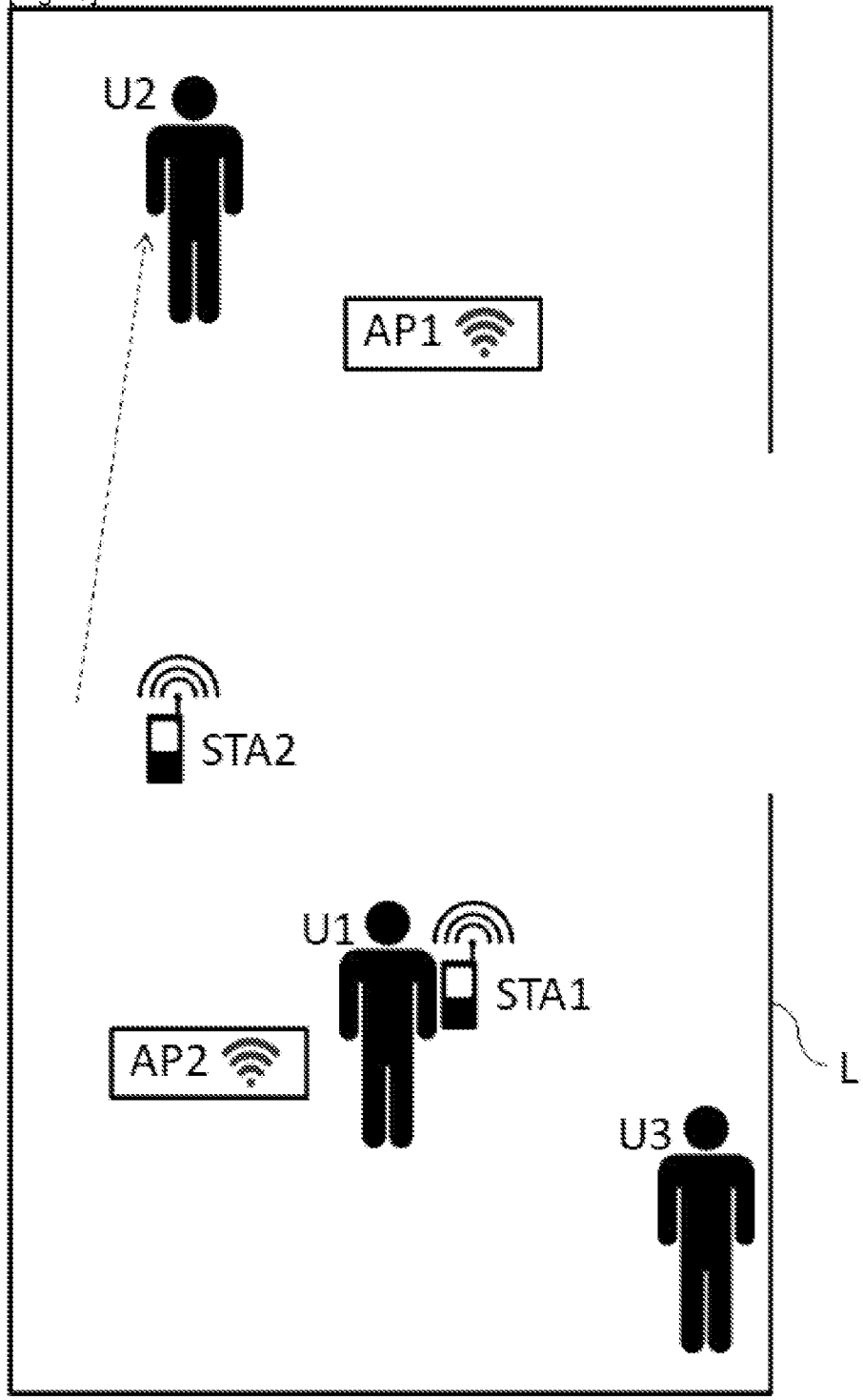

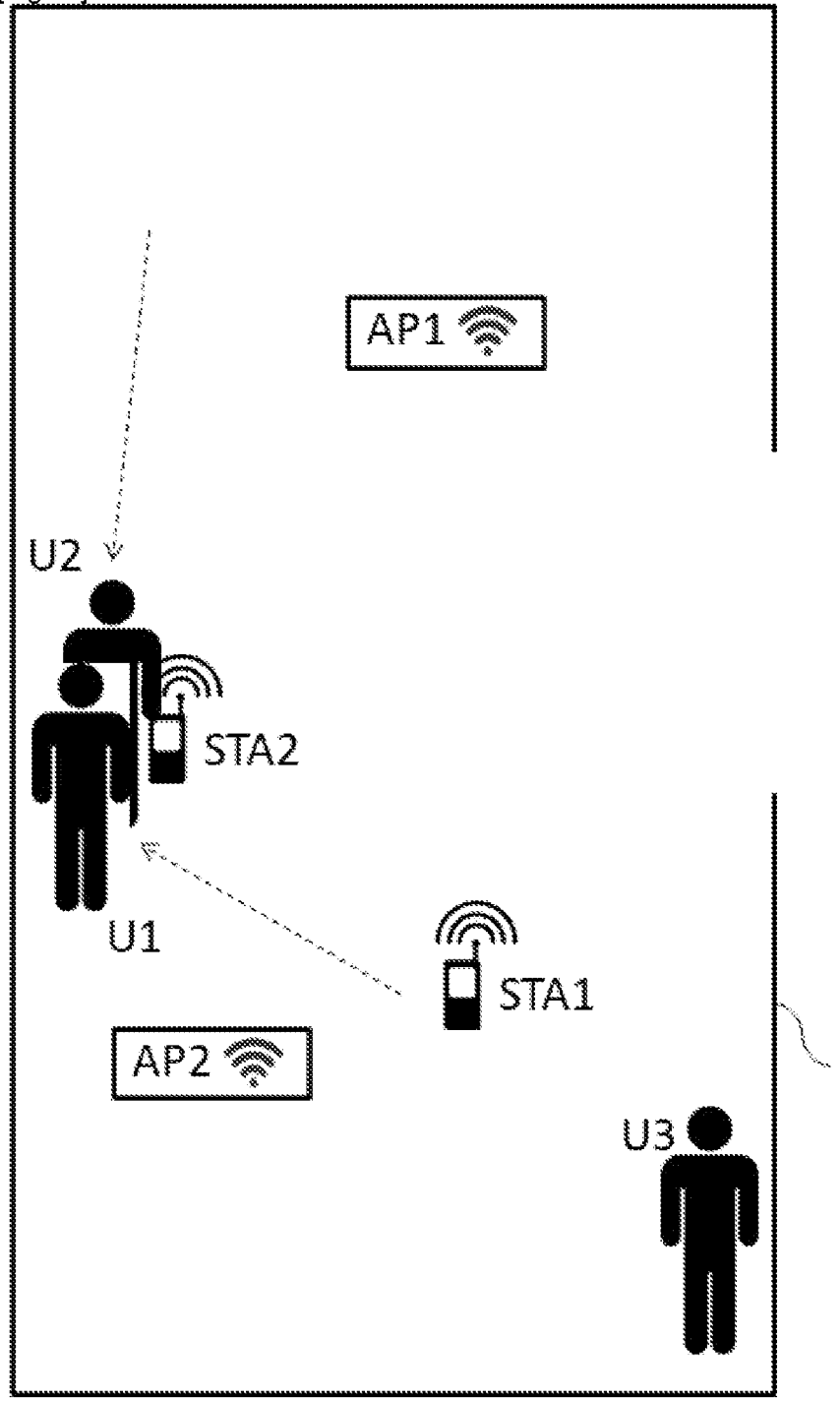

[Fig 2]
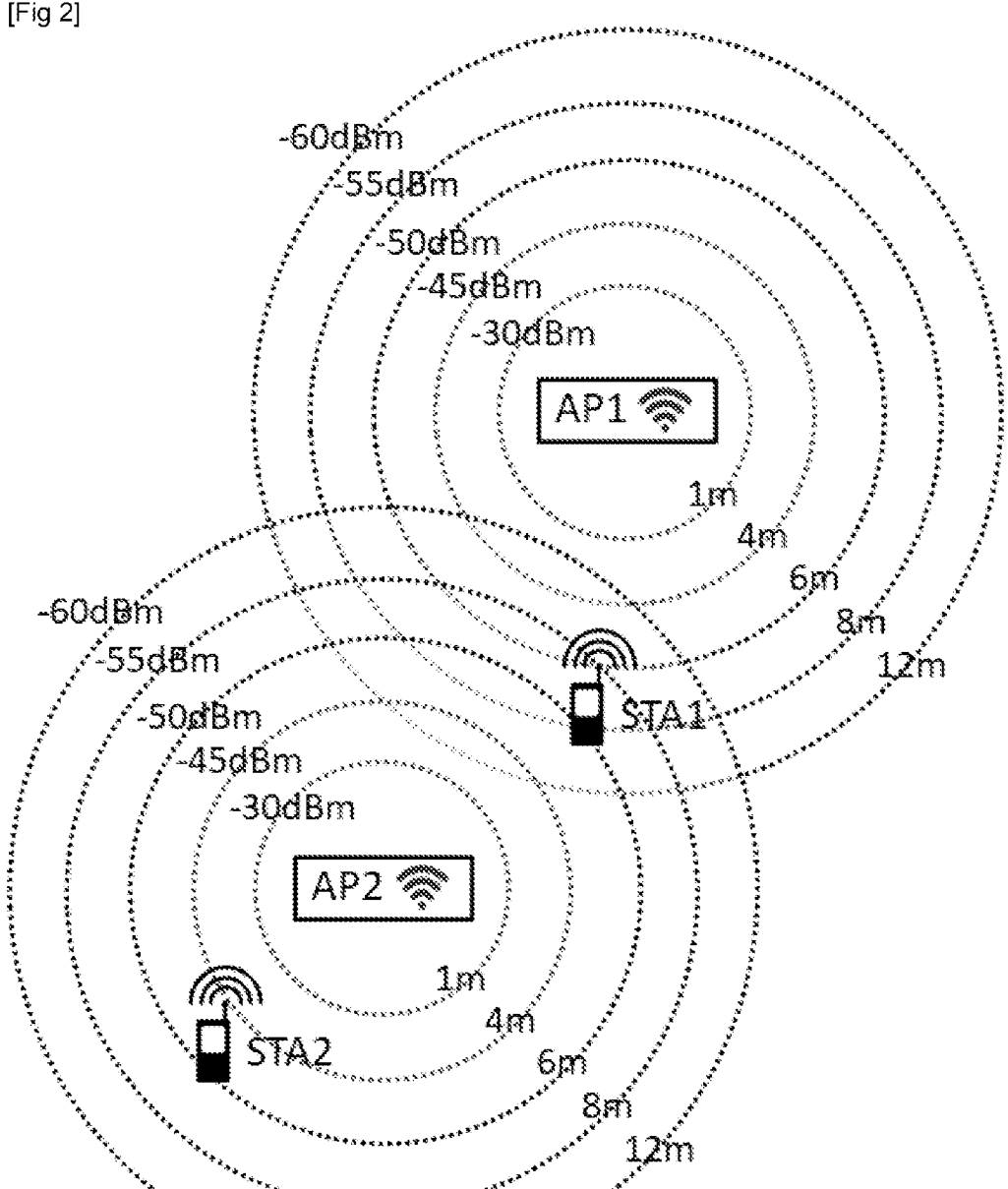

[Fig 3]
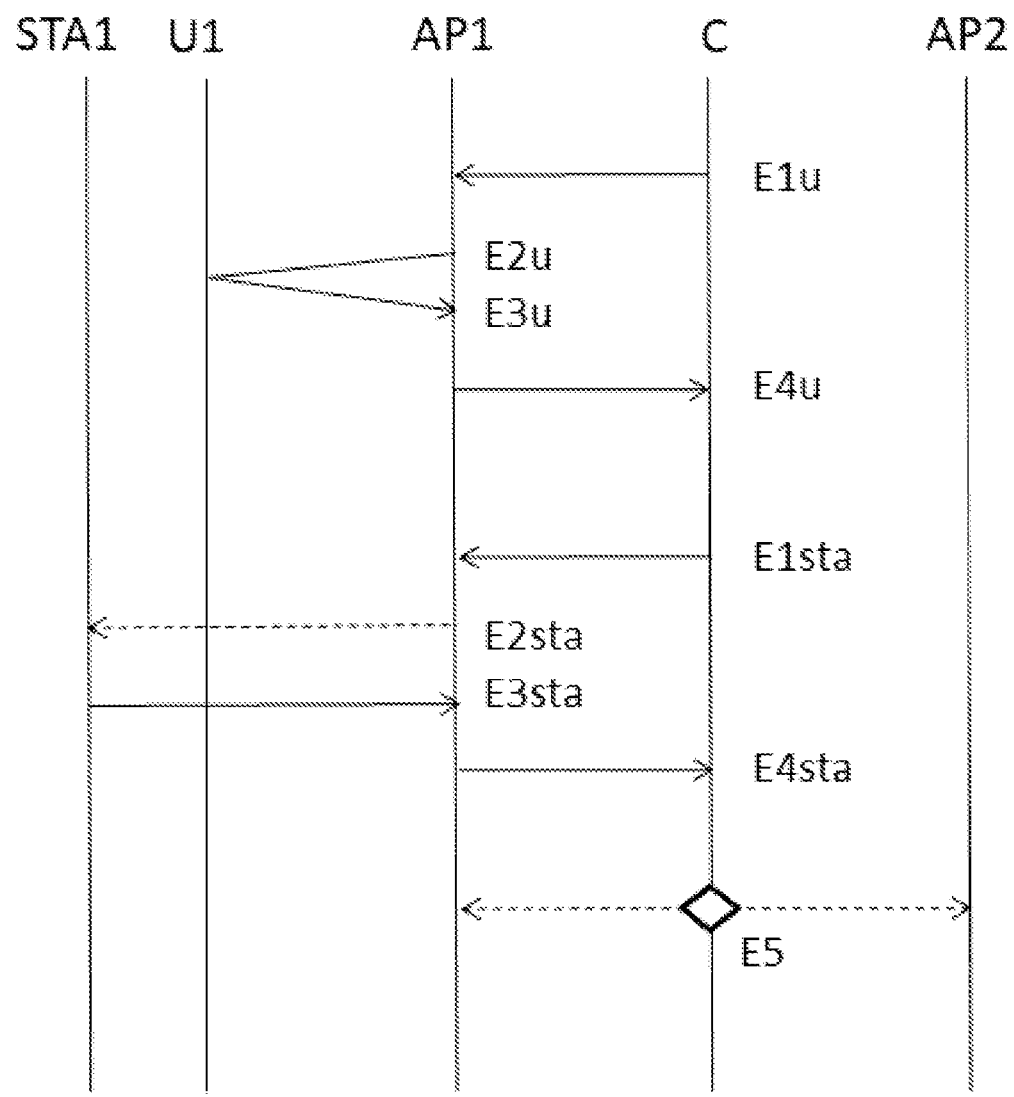

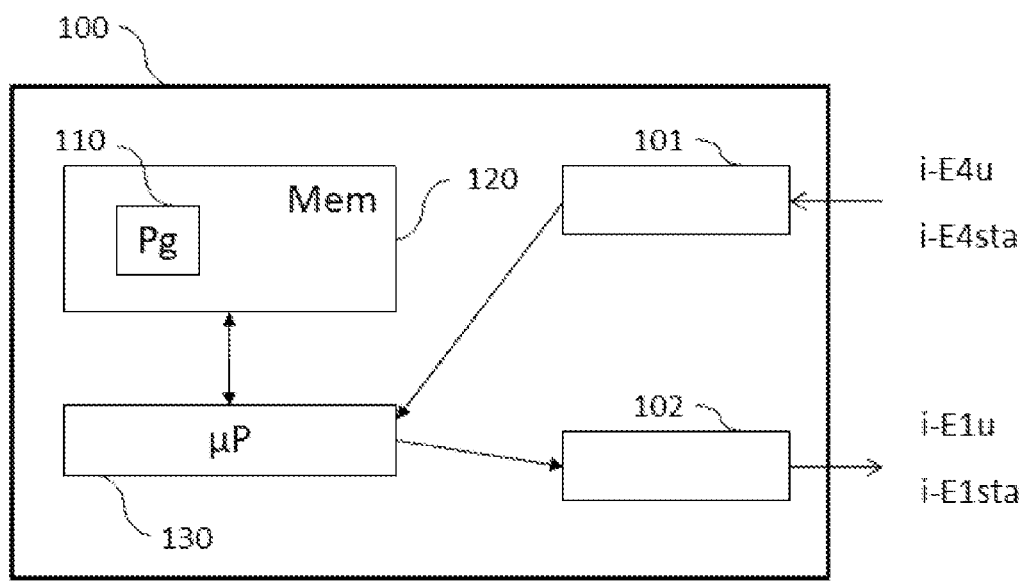

METHOD AND DEVICE FOR SWITCHING A WI-FI CONNECTION

1. FIELD OF THE DISCLOSURE

The present disclosure lies in the field of what are called Wi-Fi networks (IEEE 802.11 standards, Institute of Electrical and Electronics Engineers), and more particularly that of guiding the switching of a station (STA) between multiple access points (AP).

2. PRIOR ART

In a location equipped with one and the same home local area network (or LAN), it is common for said location to contain multiple Wi-Fi access points (AP) in order to improve radio coverage for client stations (STA) moving within the location.

When these APs are managed jointly, this being the case for example for a set of virtual access points (LVAP) sharing the same BSS identifier, there is a mechanism, called "Wi-Fi steering", that makes it possible to force a mobile STA to connect to the "best one" of the APs depending on its proximity. To determine which is the most appropriate AP for an STA, it is essential to estimate this proximity with respect to the various APs. To this end, the power level of the signal transmitted by the STA and received by the AP, called RSSI, is used to estimate the distance between STA and AP. This method is not very precise and may lead to switching decision errors.

A non-limiting exemplary aspect of the present disclosure remedies one or more of these drawbacks of the prior art.

3. SUMMARY

An exemplary aspect of the present disclosure relates to a method for switching a connection of a mobile Wi-Fi station from a first access point of a plurality of Wi-Fi access points to a second access point of the plurality, the method comprising:
- establishment of a logic link between the station and a carrier of the station, on the basis of a comparison between a first position of the carrier and at least one value in relation to a signal transmitted by the station;
- a switching decision on the basis of a second position of the carrier.

In the prior-art technique called Wi-Fi steering, the decision to switch a station that is moving between multiple access points of one and the same BSS, for example virtual access points hosted by multiple physical access points under one and the same controller, is made on the basis of values of parameters, such as for example the RSSI parameter, which the access point measures on a signal transmitted by the station. The RSSI value represents the strength of the signal received by one equipment from another, and may be equated to estimating a distance between the two equipments.

According to an aspect of the disclosure, a logic link is established between the station and its carrier, for example between a smartphone and the person using it, and the position of the carrier may thus trigger or contribute to triggering the switching of the station from one access point to another. This has, inter alia, the advantage of greater precision, compared to the value of parameters determined or measured by the access point according to the prior art, such as RSSI.

The method may be implemented by a controller of the plurality of access points, or by one of the access points of the plurality.

According to one aspect of the method, the first position and the second position of the carrier are determined by at least one access point of the plurality, on the basis of a signal reflected by the carrier, called Wi-Fi radar signal.

The position of the carrier is determined using a technique similar to radar and is more precise than an RSSI value, thereby improving the process of switching the station.

The body of a physical person is of a size sufficient to reflect radar waves transmitted by a Wi-Fi access point. This access point may therefore receive some of the reflected waves, measure them, and compute the position of the body, like a monostatic radar (transmission and reception points combined into one). This geolocation technique is called "Wi-Fi sensing" in the remainder of the document.

According to one aspect of the method, the Wi-Fi radar signals are beacon signals.

By virtue of this aspect, the position of the carrier of the station may be computed by Wi-Fi sensing at a frequency equal to that of the transmission of a Wi-Fi beacon signal, for example every 100 ms. Other types of frames transmitted by the access point may also be used as Wi-Fi radar signals, but beacon frames have the advantage of regular transmission frequency, thereby increasing the reliability and the precision of the geolocation.

In addition, by reusing existing beacon signals, there is no need to create a specific Wi-Fi signal for the Wi-Fi sensing, and the operation of the AP in transmission mode is not impacted.

According to one aspect of the method, the at least one value in relation to a signal transmitted by the station is translated into a distance of the station from an access point that transmitted the signal received by the station, in accordance with a predetermined correspondence table.

It is thus easy to determine whether it is possible for the station to be at the same location as the carrier. Indeed, if the position of the carrier is at a distance from the access point that is the same as or close to the distance, given by the correspondence table, between the station and the access point, there is a good chance that the carrier and the station are at the same location.

According to one aspect, the method comprises at least one update to the logic link after the establishment, on the basis of a comparison between a new position of the carrier and at least one new value in relation to a signal transmitted by the station.

It is important for the station to be matched to its carrier, and not to the body of another person not carrying the station. By virtue of this aspect, the carrier of the station is not confused with another body reflecting the Wi-Fi radar signals.

This check, which may be recurrent after the logic link has been established, makes it possible to check that the station is still being carried by the carrier. If this is no longer the case, this generally means that the carrier has put down the station, which then becomes immobile.

If the station is not immobile but the position determined by the Wi-Fi radar signals and the signal transmitted by the station no longer correspond, it is possible to restart the step of establishing matching with another moving body detected using Wi-Fi radar signals, or to resort to another monitoring method to decide on a possible switch, for example using the Wi-Fi steering method.

According to one aspect, the method comprises storing the logic link before the update. By virtue of this aspect, the previous value of a logic link may be used to decide between multiple possible new values when the carrier has moved away from the station and then moved towards it, for example when a person puts their smartphone down on a table, moves away from it, and then returns later to pick up the smartphone. Indeed, there may be multiple possible values for the update of the logic link when multiple carriers and multiple stations are located in the region covered by the plurality of Wi-Fi access points.

According to one aspect of the method, the logic link is established using at least two values in relation to a signal transmitted by the station, measured by at least two access points of the plurality.

By virtue of this aspect, it is made easier to establish the logic link. Indeed, the power of a signal transmitted by the station allows an access point measuring said power to estimate the radius of a circle around the access point on which the station is located. With the estimates of 2 separate access points, the intersection of the 2 distance circles around each of them makes it possible to use triangulation to estimate a position of the station, and no longer a distance. It is most precise to compare this position of the station with the position of the carrier as determined using the Wi-Fi radar signal.

According to one aspect of the method, the at least one value in relation to a signal transmitted by the station is the value of an RSSI parameter.

By virtue of this aspect, it is a parameter already used for Wi-Fi steering that is used to establish and monitor the correspondence between station and carrier. Other parameters may also be used, such as SNR (signal-to-noise ratio).

According to one aspect of the method, the switching decision is also made on the basis of a value of an RSSI parameter.

By virtue of this aspect, the switching decision depends both on a geographical position criterion regarding the carrier of the station, computed by way of the Wi-Fi sensing technique using Wi-Fi radar signals, and on a criterion used by Wi-Fi steering. The correspondence between the station and its carrier is thus checked up to the time of switching, and priority may be given to one of the two criteria in the event of a conflict.

According to one aspect of the method, the logic link is established on the basis of multiple values in relation to a signal transmitted by the station, received respectively by multiple access points.

By virtue of this aspect, it is possible to compute the distance between the station and multiple access points. In addition, triangulation may be used to compute a position of the station, and the reliability of the comparison with the position of the carrier is increased.

The various aspects of the switching method that have just been described may be implemented independently of one another or in combination with one another.

An aspect of the disclosure also relates to a device for switching a connection of a mobile Wi-Fi station from a first access point of a plurality of Wi-Fi access points to a second access point of the plurality, the device comprising a receiver, a transmitter, a processor and a memory coupled to the processor with instructions intended to be executed by the processor in order to:
  establish a logic link between the station and a carrier of the station, on the basis of a comparison between a first position of the carrier and at least one value in relation to a signal transmitted by the station;
  decide whether to switch on the basis of a second position of the carrier.

This device is able, in all of its embodiments, to implement the switching method that has just been described. It may be integrated into one of the access points of the plurality of access points, which is for example a set of virtual access points (LVAP) sharing the same BSS or SSID identifier. It may also be separate from the access points and be integrated into a separate equipment controlling the plurality of access points, such as for example a controller, as used in Wi-Fi steering. If the switching method according to an aspect of the disclosure is used in combination with the Wi-Fi steering method, the device is preferably integrated into the equipment hosting the Wi-Fi steering controller.

The Wi-Fi radar signals are transmitted by at least one, a few, or all of the access points of the plurality, which carry out measurements on the reflected signals and communicate them to the device.

An aspect of the disclosure also relates to a Wi-Fi access point comprising a switching device in accordance with what has just been described.

An aspect of the disclosure also relates to a Wi-Fi network comprising a plurality of geolocated access points, and a controller of the plurality comprising a switching device in accordance with what has just been described.

An aspect of the disclosure also relates to a computer program comprising instructions that, when these instructions are executed by a processor, prompt said processor to implement the steps of the switching method that has just been described.

An aspect of the disclosure also targets an information medium able to be read by a Wi-Fi access point and comprising instructions of a computer program as mentioned above.

The abovementioned program may use any programming language, and be in the form of source code, object code, or of intermediate code between source code and object code, such as in a partially compiled form, or in any other desirable form.

The abovementioned information medium may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to an aspect of the disclosure may in particular be downloaded from a network such as the Internet.

Alternatively, an information medium may be an integrated circuit in which a program is incorporated, the circuit being designed to execute or to be used in the execution of the method in question.

4. PRESENTATION OF THE FIGURES

Other advantages and features of aspects of the disclosure will become more clearly apparent from reading the following description of one particular embodiment of the disclosure, given by way of simple illustrative and non-limiting example, and the appended drawings, in which:

FIG. 1a shows one exemplary implementation of the method for switching a Wi-Fi station between Wi-Fi access points, according to one embodiment of the disclosure (first part of the implementation), FIG. 1b shows one exemplary implementation of the method for switching a Wi-Fi station between two Wi-Fi access points, according to one embodiment of the disclosure (second part of the implementation), FIG. 1c shows one exemplary implementation of the method for switching a Wi-Fi station between two Wi-Fi access points, according to one embodiment of the disclosure (third part of the implementation), FIG. 1d shows one exemplary implementation of the method for switching a Wi-Fi station between two Wi-Fi access points, according to one embodiment of the disclosure (fourth part of the implementation), FIG. 1e shows one exemplary implementation of the method for switching a Wi-Fi station between two Wi-Fi access points, according to one embodiment of the disclosure (fifth part of the implementation), FIG. 2 shows one example of correspondence between attenuation of a signal received by a Wi-Fi station and the distance between this station and two Wi-Fi access points, according to one aspect of the disclosure, FIG. 3 shows one example of a sequence of steps of the switching method according to one aspect of the disclosure, FIG. 4 shows one exemplary structure of a device implementing the method for switching a Wi-Fi station between Wi-Fi access points, according to one aspect of the disclosure.

5. DETAILED DESCRIPTION OF AT LEAST ONE EMBODIMENT OF THE DISCLOSURE

In the remainder of the description, it will be understood that the one or more aspects of the disclosure is applicable to all offshoots of the IEEE 802.11 standards. The Wi-Fi access points in particular may be physical or virtual (LVAP). The terms "connection" and "connect" should be understood in the Wi-Fi context and are respectively synonymous with "association" and "associate" in this document.

FIGS. 1a, 1b, 1c, 1d and 1e show one exemplary implementation of the method for switching a Wi-Fi station between Wi-Fi access points, according to one embodiment of the disclosure (first part of the implementation), in which 3 people with 2 Wi-Fi stations enter and spread out within a premises L equipped with 2 separate Wi-Fi access points. The stations STA1 and STA2 are for example "smartphones" equipped with a Wi-Fi function. The station STA1 is carried by its user, the person U1, also called carrier U1 in this document. The station STA2 is carried by its user, the person U2, also called carrier U2 in this document. The person U3 is not carrying any Wi-Fi station on them, but for convenience is also called carrier in this document (they may in theory start to carry a Wi-Fi station at any time). The access point AP1 is in a home access gateway, for example a Livebox (commercial name of the gateway provided by the operator Orange, an Internet access provider for individuals in France). The access point AP2 is in a Wi-Fi repeater that makes it possible to provide Internet access from the Livebox in rooms of the premises L that are too far away from the access point AP1 to comfortably receive its Wi-Fi signal. The access points AP1 and AP2 may form a Wi-Fi network in the premises L.

There is also a control device C, or controller, not illustrated, that may be hosted in the Livebox with the access point AP1, or be physically separate from the access points in a separate equipment, inside or outside the premises L. A communication link is established between the controller and each of the access points AP1 and AP2, for example using Wi-Fi, or using any other wired or wireless means.

At the time T0, the carriers U1, U2 and U3 and the stations STA1 and STA2 are too far away from the premises L to be within the range of the access points AP1 and AP2. For the controller C, there is not yet any link between carriers and Wi-Fi stations.

At the time T0+5 (FIG. 1a), the 3 carriers U1, U2 and U3 enter the premises L at the same time as the stations STA1 and STA2. Since the access point AP1 is closest to the entrance, the stations STA1 and STA2 connect to this access point. Since the 3 carriers and the 2 stations are also grouped together at the same location close to the entrance, using the Wi-Fi sensing technique described further below, the controller C determines that the carriers U1, U2 are U3 are 8 m away from the access point AP1. The controller C also determines that the stations STA1 and STA2 are connected to the access point AP1 with an attenuation of −55 dBm, this corresponding to a distance of 8 m. The controller C deduces from this that all of the carriers and all of the stations are at the same location, and establishes the following logic links:

logic link LL1=(U1)+(STA1, STA2)
   signifying that the carrier U1 is linked both to the station STA1 and to the station STA2,
logic link LL2=(U2)+(STA1, STA2)
   signifying that the carrier U2 is linked both to the station STA1 and to the station STA2,
logic link LL3=(U3)+(STA1, STA2)
   signifying that the carrier U3 is linked both to the station STA1 and to the station STA2.

At the time T0+10 (FIG. 1b), the carriers spread out in the premises L. The controller C determines that the station STA1 is connected to the access point AP1 with an attenuation of −30 dBm, this corresponding to a distance of 1 m, and that the station STA2 is connected to the access point AP2 with an attenuation of −52 dBm, this corresponding to a distance of 7 m. For simplicity, the possible ways in which the station STA2 switched from the access point AP1 to the access point AP2 are not described here. This may be according to a prior-art technique, on the initiative of the station (by "handover") or of the controller (by steering), or using the same method as the one described here, that is to say according to the disclosure.

The controller C also determines, through Wi-Fi sensing, that:
   one carrier is 1 m away from the access point AP1 and 14 m away from the access point AP2,
   one carrier is 16 m away from the access point AP1 and 7 m away from the access point AP2,
   one carrier is 14 m away from the access point AP1 and 13 m away from the access point AP2.
The controller C deduces from this that:
   the carrier who is 1 m away from the access point AP1 is at the same location as the station STA1,
   the carrier who is 7 m away from the access point AP2 is at the same location as the station STA2,
   the carrier who is 14 m away from the access point AP1 and 13 m away from the access point AP2 is not at a location where a station is also located.
The controller C therefore updates the logic links that it determined at the time T0+5:
   logic link LL1=(U1)+(STA1)
      signifying that the carrier U1 is linked to the station STA1,
   logic link LL2=(U2)+(STA2)
      signifying that the carrier U2 is linked to the station STA2, logic link LL3=(U3)
   signifying that the carrier U3 is not linked to any station.

In addition, the controller C stores the previous links as they were before the update:
   logic link LL1_ANT=(U1)+(STA1, STA2)
   logic link LL2_ANT=(U2)+(STA1, STA2)
   logic link LL3_ANT=(U3)+(STA1, STA2)

It will be noted that the order and the numbering of the links and the carriers were determined randomly when the logic links were created at the time T0+5, and are retained hereinafter.

At the time T0+15 (FIG. 1c), the carrier U1 moves, with the station STA1. The carriers U2 and U3 do not move. The controller C determines that the station STA1 is connected to the access point AP1 with an attenuation of −50 dBm, this corresponding to a distance of 6 m (new situation compared to the time T0+10), and that the station STA2 is connected to the access point AP2 with an attenuation of −52 dBm, this corresponding to a distance of 7 m (situation unchanged compared to the time T0+10).

The controller C also determines, through Wi-Fi sensing, that:
   one carrier is 6 m away from the access point AP1 and 4 m away from the access point AP2 (new situation compared to the time T0+10),
   one carrier is 16 m away from the access point AP1 and 7 m away from the access point AP2 (situation unchanged compared to the time T0+10),
   one carrier is 14 m away from the access point AP1 and 13 m away from the access point AP2 (situation unchanged compared to the time T0+10).

The controller C deduces from this that:
   the carrier who is 6 m away from the access point AP1 is at the same location as the station STA1,
   the carrier who is 7 m away from the access point AP2 is at the same location as the station STA2,
   the carrier who is 14 m away from the access point AP1 and 13 m away from the access point AP2 is not at a location where a station is also located.

The controller C therefore does not modify the logic links that it updated at the time T0+10, which remain:
   logic link LL1=(U1)+(STA1)
   logic link LL2=(U2)+(STA2)
   logic link LL3=(U3)

The controller C also does not modify the stored previous links, which remain:
   logic link LL1_ANT=(U1)+(STA1, STA2)
   logic link LL2_ANT=(U2)+(STA1, STA2)
   logic link LL3_ANT=(U3)+(STA1, STA2)

By contrast, what has changed is that, by virtue of the logic link LL1, the controller C detects that the position of the station STA1, determined with precision through Wi-Fi sensing since it is that of the carrier U1, is now closer to the access point AP2 than to the access point AP1. As a result, the controller C makes the decision to switch the connection of the station STA1 from the access point AP1 to the access point AP2. The controller C transmits a switching order to the access point AP1, for example using a method known by the name EasyMesh, defined by the Wi-Fi Alliance standardization body. The access point AP1 may then for example transmit, to the station STA1, a list of access points to which the station is invited to connect, containing only the access point AP2 (for example a BTM Request message).

At the time T0+20 (FIG. 1d), the carrier U2 moves, without the station STA2. The carriers U1 and U3 do not move. The controller C determines that the station STA1 is connected to the access point AP1 with an attenuation of −50 dBm, this corresponding to a distance of 6 m (situation unchanged compared to the time T0+15), and that the station STA2 is connected to the access point AP2 with an attenuation of −52 dBm, this corresponding to a distance of 7 m (situation unchanged compared to the time T0+15).

The controller C also determines, through Wi-Fi sensing, that:
   one carrier is 6 m away from the access point AP1 and 4 m away from the access point AP2 (situation unchanged compared to the time T0+15),
   one carrier is 7 m away from the access point AP1 and 14 m away from the access point AP2 (new situation compared to the time T0+15),
   one carrier is 14 m away from the access point AP1 and 13 m away from the access point AP2 (situation unchanged compared to the time T0+15).

The controller C deduces from this that:
   the carrier who is 6 m away from the access point AP1 is at the same location as the station STA1,
   the carrier who is 14 m away from the access point AP2 is no longer at the same location as the station STA2, and is also no longer at the same location as the station STA1,
   the carrier who is 14 m away from the access point AP1 and 13 m away from the access point AP2 is not at a location where a station is also located.

The controller C therefore updates the logic links as follows:
   logic link LL1=(U1)+(STA1)
      (as before),
   logic link LL2=(U2)
      signifying that the carrier U2 is now not linked to any station,
   logic link LL3=(U3)
      (as before).

The controller C also updates the stored previous logic links as follows:
   logic link LL1_ANT=(U1)+(STA1, STA2)
      (unchanged),
   logic link LL2_ANT=(U2)+(STA2)
      (new, signifying that the carrier U2 was previously linked to the station STA2),
   logic link LL3_ANT=(U3)+(STA1, STA2)
      (unchanged).

At the time T0+30 (FIG. 1e), the carrier U2 moves again, towards the station STA2, which he picks up. The carrier U1 moves to the same location as U2, but without the station STA1, which he has put down. Using the mechanisms disclosed above, the controller C determines that U1, U2 and STA2 are at the same location, which could pose a difficulty for the controller C in terms of determining how to update the existing logic links. Indeed, two new logic links are possible: the carrier U2 is linked to the station STA2, or the carrier U1 is linked to the station STA2. By consulting the stored previous logic links, the controller C establishes that a previous link LL2_ANT linked, 1 to 1, the carrier U2 to the station STA2, and that no previous link linked, 1 to 1, the carrier U1 to the station STA2. The stored previous links allow the controller C to give preference to the one that is more likely to be reproduced, which is the link LL2_ANT. The controller C therefore updates the logic links as follows:
   logic link LL1=(U1)
      updated; signifying that the carrier U1 is now not linked to any station,
   logic link LL2=(U2, STA2)

updated; signifying that the carrier U2 is linked to the station STA2, logic link LL3=(U3)
(unchanged).

Storing the previous links makes it possible to avoid the controller C having to be capable of distinguishing between the various carriers. It should be noted that, in this embodiment, a logic link links a single carrier to any number of stations (0, 1 or more). Another embodiment, in which a logic link links a single station to any number of carriers, is possible.

FIG. 2 shows one example of correspondence between attenuation of a signal received by a Wi-Fi station and the distance between this station and two Wi-Fi access points, according to one aspect of the disclosure.

In this example, the access point AP1 receives, from the station STA1, a signal with an RSSI parameter value equal to −50 dBm. The access point AP2 for its part receives, from the station STA2, a signal with an RSSI parameter value equal to −45 dBm. According to charts that are predetermined depending on the type of Wi-Fi station (Wi-Fi 4, Wi-Fi 5 or Wi-Fi 6), and possibly depending on other parameters such as the configuration of the environment (indoors with partitions of particular types, etc.), a correspondence may be created between the value of the RSSI parameter and the distance between the station and the access point to which it is connected.

In the example of FIG. 2 in which such a chart is illustrated, the access point controller may determine, solely on the basis of the RSSI parameters, that the station STA1 is located 6 m away (RSSI=−50 dBm) from the access point AP1, and that the station STA2 is located 4 m away (RSSI=−45 dBm) from the access point AP2. In theory, the controller is also able to retrieve the RSSI parameters of the access point AP2 measured on a signal from the station STA1 even if this station is not connected to the access point AP2, and the controller may then furthermore determine that the station STA1 is located 8 m away (RSSI=−55 dBm) from the access point AP2, and may use triangulation to estimate the position of the station STA1 more precisely. This is by contrast not possible for the station STA2, which is connected to the access point AP2 but is out of range of the access point AP1.

By virtue of its radar mechanism, Wi-Fi sensing makes it possible to geolocate, with precision greater than the estimation made using the RSSI parameter, any station carrier from a single access point, without having to resort to triangulation. However, it is necessary to be able to link the carrier to the correct station, as was described above.

Wi-Fi sensing uses existing Wi-Fi signals transmitted by an access point to detect events and changes, such as for example movements of bodies or objects around the access point. The access point processes the signals received through reflection, in the same way as a radar, and feeds back information in relation to these reflected signals to a control device (such as the controller C), which performs the computations needed to determine the position of the body or of the object.

In practice, this means that Wi-Fi networks may be used to identify and measure distances, linear or angular speeds, detect movements (or even simple gestures or breathing), presence, proximity, for objects, people or animals, in a room, a house, a car or a building.

According to one embodiment, the beacon frames transmitted by the access points are used as "Wi-Fi radar" signals. Since these frames are transmitted every 100 ms, it is possible to update the position of a person every 100 ms. This is a frequency far greater than that able to be achieved with the Wi-Fi steering technique.

Wi-Fi sensing, that is to say determining the position of a body using existing Wi-Fi signals used as radar signals, is possible provided that an access point is functional. Wi-Fi sensing may be performed on all frequency bands used by a physical access point, and of course more generally on all frequency bands of all physical access points provided that these bands are operational.

In the simple case of use on a single frequency band, since the access points are not time-synchronized, they transmit their beacon frames in an uncoordinated manner but all at the same frequency (every 100 ms). It is therefore possible to send to the controller, every 100 ms, information for locating people to the controller.

This represents a large amount of information to be sent, and it is not necessary for all of the access points to do this continuously. Indeed, after the establishment of a logic link between the person (the carrier) and a station according to the method presented above, if the station is connected for example to the access point AP1, Wi-Fi sensing will be triggered on access points other than AP1 only if the person moves away from the access point AP1 by beyond a certain threshold and/or moves towards another access point to below a certain threshold. It is also possible to trigger Wi-Fi sensing mode only on the access point that has become closest to the person, and not on the other access points.

The controller may then order this access point to monitor:
- the station using mechanisms from the Wi-Fi steering method (based on RSSI),
- and/or the person linked to the station using Wi-Fi sensing,
- in order to trigger switching of the connection of the station to this access point as soon as predetermined switching conditions are met. These conditions may for example be the same as those of Wi-Fi steering, that is to say RSSI values fed back by the station with the new access point that are greater than those fed back with the old one.

FIG. 3 shows one example of a sequence of steps of the switching method according to one aspect of the disclosure.

The steps of the method may be divided into 3 groups. A first group depicts the operating mode called Wi-Fi sensing, and consists of the steps E1$u$ to E4$u$. A second group depicts part of the operating mode called Wi-Fi steering (without the switching decision), and consists of the steps E1$sta$ to E4$sta$. The last group is that of the switching decision step E5.

In step E1$u$, the controller C commands the access point AP1 to change to Wi-Fi sensing mode, that is to say to monitor a body moving around it.

In response, in step E2$u$, the access point AP1 transmits a Wi-Fi frame, for example a beacon frame, called Wi-Fi radar signal. This signal rebounds off the carrier U1 and returns to the access point, which receives it in degraded form in step E3$u$.

In step E4$u$, the access point AP1 transmits information in relation to this signal to the controller C. This information is for example an FFT (fast Fourier transform) of the signal received by the access point. Such information makes it possible to compute a position with respect to the access point, using a technique such as that disclosed for example in the article "Multi-Person Localization via RF Body Reflections", by Fadel Adib et al., NSDI'15: Proceedings of the 12th USENIX Conference on Networked Systems Design and Implementation, May 2015. This computation may be carried out by the controller, or by the access point.

In the latter case, the information in relation to the signal, transmitted by the access point, is a set of coordinates, for example a distance and an angle.

Steps E2u and E3u may be repeated at the same frequency as the beacon frames, that is to say every 100 ms. Step E4u may be repeated at a lower frequency so as not to overload the controller C.

In step E1sta, the controller C commands the access point AP1 to change to partial Wi-Fi steering mode, that is to say to monitor the station STA1 that is connected thereto by monitoring its RSSI parameter, but without deciding on any switching of the connection.

In step E3sta, possibly in response to a Wi-Fi frame transmitted in a step E2sta calling upon a response from the station STA1, this station transmits, to the access point AP1, a Wi-Fi frame constituting a signal, from which the access point AP1 extracts for example a value of the RSSI parameter representative of the power of the signal transmitted by the station, upon reception thereof by the access point.

In step E4sta, the access point AP1 transmits the value of the RSSI parameter to the controller C.

Step E3sta may be repeated each time the station STA1 transmits a Wi-Fi frame to the access point AP1. Step E4sta may be repeated at a lower frequency so as not to overload the controller C.

In step E5, the controller C processes the information that it received from the access point AP1 and computes the position of the carrier U1, the distance between U1 and the access point AP1, and/or the distance between the station STA1 and the access point AP1. In this step, the controller C may create a logic link between the carrier U1 and the station STA1 if no link yet exists between them, and if the position of the carrier U1 corresponds to a possible position of the station STA1, given its distance from the access point AP1. Otherwise, in this step E5, if this position and this distance no longer correspond and the logic link already exists, the controller may update it.

Finally, if the link exists, and the position of the carrier U1 has changed so as to move closer to an access point other than AP1, for example the access point AP2, the controller may decide to switch the station STA1 to the access point AP2. As an alternative, for example if this approach is not sufficient (predefined threshold not reached), it may anticipate such a switch by commanding the access point AP2 to change to Wi-Fi sensing mode (step E1u applied to AP2), or to partial steering mode (step E1sta applied to AP2), this being possible even without the station STA1 being connected to the access point AP2.

The frequency of step E5 is independent of the frequency of the other steps.

FIG. 4 shows one exemplary structure of a device implementing the method for switching a Wi-Fi station between Wi-Fi access points, according to one aspect of the disclosure.

The device 100 implements the switching method, various embodiments of which have just been described.

Such a device 100 may be implemented in an equipment controlling a plurality of Wi-Fi access points. This equipment, for example the controller C, may be separate from the controlled access points or integrated into one of them. This Wi-Fi access point, for example the access point AP1, may be a home gateway or business gateway, or a home router or business router, for accessing the Internet.

For example, the device 100 comprises a receiver 101, a transmitter 102, a processing unit 130, equipped for example with a microprocessor µP, and controlled by a computer program 110, stored in a memory 120 and implementing the switching method according to the disclosure. On initialization, the code instructions of the computer program 110 are for example loaded into a RAM memory, before being executed by the processor of the processing unit 130.

Such a memory 120, such a processor of the processing unit 130, such a receiver 101 and such a transmitter 102 are able and configured to:

establish a logic link between the station and a carrier of the station, on the basis of a comparison between a first position of the carrier and at least one value in relation to a signal transmitted by the station; and decide whether to switch on the basis of a second position of the carrier.

Advantageously, they are also able and configured to:

update the logic link after the establishment, on the basis of a comparison between a new position of the carrier and at least one new value in relation to a signal transmitted by the station, store the logic link before the update, transmit a command i-E1u to an access point ordering it to change to Wi-Fi sensing mode, that is to say to monitor a body around it, receive, in response, information i-E4u for obtaining or computing a position of the body with respect to the access point, transmit a command i-E1sta to an access point ordering it to change to partial Wi-Fi steering mode, that is to say to monitor a station by monitoring the RSSI parameter of the station, but without deciding on a possible switch of the connection, receive, in response, information i-E4sta comprising a value of the RSSI parameter.

The described entities included in the devices described with reference to FIG. 4 may be hardware or software entities. FIG. 4 illustrates just one particular way from among several possible ones of implementing the method described above with reference to the preceding figures. Specifically, the technique of the invention is carried out indiscriminately on a reprogrammable computing machine (a PC, a DSP processor or a microcontroller) executing a program comprising a sequence of instructions, or on a dedicated computing machine (for example a set of logic gates such as an FPGA or an ASIC, or any other hardware module).

If the invention is installed on a reprogrammable computing machine, the corresponding program (that is to say the sequence of instructions) may be stored in a removable storage medium (such as for example a USB stick, a floppy disk, a CD-ROM or a DVD-ROM) or a non-removable storage medium, this storage medium being able to be read partly or fully by a computer or a processor.

Although the present disclosure has been described with reference to one or more examples, workers skilled in the art will recognize that changes may be made in form and detail without departing from the scope of the disclosure and/or the appended claims.

What is claimed in:

1. A method for switching a connection of a mobile Wi-Fi station from a first access point of a plurality of Wi-Fi access points to a second access point of the plurality of Wi-Fi access points, the method being implemented by a device and comprising:

establishing a logic link between the station and a carrier of the station, on the basis of a comparison between a first position of the carrier and at least one value in relation to a signal transmitted by the station;

performing a switching decision on the basis of a second position of the carrier; and maintaining the connection of the mobile Wi-Fi station to the first access point or switching the connection of the mobile Wi-Fi station to the second access point based on the decision.

2. The method according to claim 1, wherein the first position and the second position of the carrier are determined by at least one access point of the plurality of Wi-Fi access points, on the basis of a signal reflected by the carrier, called Wi-Fi radar signal.

3. The method according to claim 2, wherein the Wi-Fi radar signal is a beacon signal.

4. The method according to claim 1, comprising translating the at least one value in relation to the signal transmitted by the station into a distance of the station from an access point that transmitted the signal received by the station, in accordance with a predetermined correspondence table.

5. The method according to claim 1, comprising performing at least one update to the logic link after establishing, on the basis of a comparison between a new position of the carrier and at least one new value in relation to a new signal transmitted by the station.

6. The method according to claim 5, comprising storing the logic link before the update.

7. The method according to claim 1, wherein the logic link is established using at least two values in relation to the signal transmitted by the station, measured by at least two access points of the plurality of Wi-Fi access points.

8. The method according to claim 1, wherein the at least one value in relation to the signal transmitted by the station is a value of a Received Signal Strength Indicator (an RSSI) parameter.

9. The method according to claim 1, wherein the switching decision is also made on the basis of a value of a Received Signal Strength Indicator (an RSSI) parameter.

10. The method according to claim 1, wherein the logic link is established on the basis of multiple values in relation to the signal transmitted by the station, received respectively by multiple access points.

11. A device comprising:
a receiver,
a transmitter,
a processor; and
a memory coupled to the processor with instructions, which when executed by the processor implement a method of switching a connection of a mobile Wi-Fi station from a first access point of a plurality of Wi-Fi access points to a second access point of the plurality of Wi-Fi access points, the method comprising:
establishing a logic link between the station and a carrier of the station, on the basis of a comparison between a first position of the carrier and at least one value in relation to a signal transmitted by the station; and
performing a switching decision whether to switch on the basis of a second position of the carrier; and
maintaining the connection of the mobile Wi-Fi station to the first access point or switching the connection of the mobile Wi-Fi station to the second access point based on the decision.

12. A Wi-Fi access point of the plurality of Wi-Fi access points, which comprises the device according to claim 11.

13. A Wi-Fi network comprising the plurality of Wi-Fi access points and a controller able to control the plurality of access points, the controller comprising the device according to claim 11.

14. A non-transitory computer readable information medium comprising instructions of a computer program stored thereon which when executed by a processor of a device configure the device to implement a method of switching a connection of a mobile Wi-Fi station from a first access point of a plurality of Wi-Fi access points to a second access point of the plurality of Wi-Fi access points, the method comprising:
establishing a logic link between the station and a carrier of the station, on the basis of a comparison between a first position of the carrier and at least one value in relation to a signal transmitted by the station;
performing a switching decision on the basis of a second position of the carrier; and
maintaining the connection of the mobile Wi-Fi station to the first access point or switching the connection of the mobile Wi-Fi station to the second access point based on the decision.

* * * * *